(12) United States Patent
Niwano et al.

(10) Patent No.: US 10,451,450 B2
(45) Date of Patent: Oct. 22, 2019

(54) EXTERNAL DEVICE FOR MEASURING INSTRUMENT

(71) Applicant: MITUTOYO CORPORATION, Kawasaki, Kanagawa (JP)

(72) Inventors: Atsuya Niwano, Tokyo (JP); Shuji Hayashida, Kanagawa (JP); Nobuyuki Hayashi, Kanagawa (JP); Yuji Fujikawa, Hiroshima (JP); Koji Matsumoto, Hiroshima (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 15/641,845

(22) Filed: Jul. 5, 2017

(65) Prior Publication Data

US 2018/0052017 A1 Feb. 22, 2018

(30) Foreign Application Priority Data

Aug. 22, 2016 (JP) .................. 2016-162294

(51) Int. Cl.
*G01D 7/00* (2006.01)
*G01B 21/04* (2006.01)
*G01B 3/18* (2006.01)
*G08C 17/00* (2006.01)

(52) U.S. Cl.
CPC .............. *G01D 7/00* (2013.01); *G01B 3/18* (2013.01); *G01B 21/047* (2013.01); *G08C 17/00* (2013.01)

(58) Field of Classification Search
CPC .......... G01B 3/1061; G01B 2003/1069; G01B 3/1071; G01B 2003/1074; G01B 21/047; G01B 3/18; G08C 17/00; G01D 7/00
See application file for complete search history.

(56) References Cited

U.S. PATENT DOCUMENTS

| 5,659,361 | A | * | 8/1997 | Jin | .................. H04N 5/2251 248/921 |
|---|---|---|---|---|---|
| 6,502,057 | B1 | | 12/2002 | Suzuki | |
| 2006/0215052 | A1 | * | 9/2006 | Nagaoka | .............. H04N 5/2251 348/333.06 |
| 2008/0122965 | A1 | * | 5/2008 | Fang | .................. H04N 1/00204 348/333.06 |
| 2011/0158466 | A1 | * | 6/2011 | Liao | .................. H04N 5/232 382/100 |

(Continued)

FOREIGN PATENT DOCUMENTS

| JP | 406233160 | * | 8/1994 |
|---|---|---|---|
| JP | H07-086957 B2 | | 9/1995 |

(Continued)

*Primary Examiner* — Robert R Raevis
(74) *Attorney, Agent, or Firm* — Oliff PLC

(57) ABSTRACT

An external device is configured to be detachably attached to a measuring instrument via a connector. The external device includes a connector part, an external device body part and a movable connection part. The connector part has a connection terminal. The external device body part has a display part on a side surface of the external device body part. The movable connection part is configured to connect the connector part with the external device body part. The movable connection part is a biaxial rotation hinge having two pivot axes which are in a twisted position relationship with respect to each other.

5 Claims, 6 Drawing Sheets

(56) References Cited

U.S. PATENT DOCUMENTS

2014/0002612 A1* 1/2014 Morioka ................ G03B 35/08
348/46

FOREIGN PATENT DOCUMENTS

| JP | 09062398 | * | 3/1997 |
| JP | 2006180299 | * | 7/2006 |
| JP | 2007-305055 A | | 11/2007 |
| JP | 2009011317 | * | 2/2009 |
| JP | 4456697 B2 | | 4/2010 |

* cited by examiner

EXTERNAL DEVICE FOR MEASURING INSTRUMENT

CROSS-REFERENCE TO RELATED APPLICATION

This application claims the benefit of Japanese Patent Application No. 2016-162294, filed on Aug. 22, 2016, the entire contents of which are hereby incorporated by reference, the same as if set forth at length, the entire of which are incorporated herein by reference.

TECHNICAL FIELD

The present invention relates to an external device configured to be detachably attached to a measuring instrument.

BACKGROUND ART

As small measuring instruments which allow a measurer to carry out measurement by hand, for example, a dial gauge, a vernier calipers and a micrometer are known. These small measuring instruments have been also multi-functionalized, and thus various functions such as a wireless communication function have been installed thereon.

There are several types of multi-functionalized measuring instruments.

A first type is a type in which various functions are equipped in a measuring instrument. For example, a wireless communication function can be equipped. Since a measuring instrument is designed such that various functions are integrally equipped therein, completeness in product design is high and also operability is good.

However, all functions are not required for all users, and thus users, who need the wireless communication function, and users, who does not need the wireless communication function, exist. Therefore, a model, in which the wireless communication function is equipped, and a model, in which the wireless communication function is not equipped, are both manufactured and sold. However, this is not realistic to be developed in all types.

Thus, a type is also known, in which a connection port for a connector is provided in a measuring instrument and an external device is connected to the connection port via the connector (JP-A-2007-305055, JP-B-4456697 and JP-B-H07-086957).

However, there are restrictions on position, in which the connection port is provided, depending on types or sizes of measuring instruments.

In addition, the connected external device has not to become an obstacle in the way of measurement.

The small measuring instrument has the convenience of being capable of allowing measurement to be carried out while being grasped with one hand. However, a posture of grasping the measuring instrument is changed depending on an object to be measured or a site to be measured as well as a type of the measuring instrument.

Therefore, in JP-A-2007-305055, an external wireless communication device includes a connector, a wireless communication device and a flexible cable for connecting the connector to the wireless communication device. In the case of this configuration, a degree of freedom of arrangement of the wireless communication device is increased regardless of a position of the connection port due to the flexible cable.

Also, in an external wireless communication device disclosed in JP-B-4456697, a connector and a wireless communication device are configured as an integral unit. When the connector is inserted into a connection port, the wireless communication device is simultaneously fixedly attached to the measuring instrument. Since the wireless communication function is fixedly attached to the measuring instrument, operability is good.

Further, in JP-B-H07-086957, an external memory is configured to be freely detachably attached to the measuring instrument. The external memory has one rotation axis and a housing part thereof is configured to be rotated by 180°.

SUMMARY OF INVENTION

In the case of the configuration of JP-A-2007-305055, the degree of freedom of arrangement of the wireless communication device is increased regardless of a position of the connection port due to the flexible cable. However, the cable is cumbersome and thus operability is also hindered.

In the case of the configuration of JP-B-4456697, the wireless communication function is fixedly attached to the measuring instrument, thereby providing a good operability.

However, various types of external wireless communication devices have to be prepared for each of types or sizes of small measuring instruments, and thus cost burden on both manufacturers and users is increased.

In the external memory of JP-B-H07-086957, the housing is pivotally supported by the rotation axis and thus can be rotated. By using the rotation axis, the housing can be moved to a position where the housing does not become an obstacle in the way of measurement.

However, if the external device is a simple external memory, it is sufficient to move the external memory to such a position at which the external memory does not become an obstacle. If the external device also has a display function or wireless communication function, the external device has to be positioned to additionally exhibit the display function or wireless communication function.

For example, it is meaningless that when the housing is rotated not to become an obstacle, a display part is invisible to a user. Similarly, it is meaningless that when the housing is rotated not to become an obstacle, a wireless communication device is poor in communication.

Although in the foregoing, the wireless communication function or the display function has been described by way of example, there are other functions, which are not always required for all users but are desired to be used in combination when necessary, such as a lighting, an auxiliary battery, an external memory, a printer or the like. It is convenient that these can be detachably attached as external devices to the small measuring instrument. However, there are challenges to preventing the external device from becoming an obstacle in the way of measurement and allowing desired functions to be sufficiently exhibited, and thus commercialization thereof has not been properly achieved so far.

An object of the present invention is to provide an external device for a measuring device in which functions of the measuring instrument can be expanded without hampering operability.

According to one aspect of the disclosure, an external device is configured to be detachably attached to a measuring instrument via a connector. The external device includes a connector part, an external device body part and a movable connection part. The connector part has a connection terminal. The external device body part has a display part on a side surface of the external device body part. The movable connection part is configured to connect the connector part with the external device body part. The movable connection part is a biaxial rotation hinge having two pivot axes which are in a twisted position relationship with respect to each other.

According to one aspect of the disclosure, the external device body part is configured to perform a wireless communication.

According to one aspect of the disclosure, the display part is configured to rotate an orientation of an indication on the display unit by a user instruction or automatically.

According to one aspect of the disclosure, the external device further includes a light. The light is configured to illuminate an object to be measured when the external device is connected with the measuring instrument.

According to one aspect of the disclosure, the external device further includes a rechargeable battery. The rechargeable battery is configured to supply electric power to the measuring instrument when the external device is connected with the measuring instrument.

According to one aspect of the disclosure, the measuring instrument to be connected with the external device is a digital micrometer, a digital vernier calipers, or a digital indicator.

DESCRIPTION OF EMBODIMENTS

Figure 1:
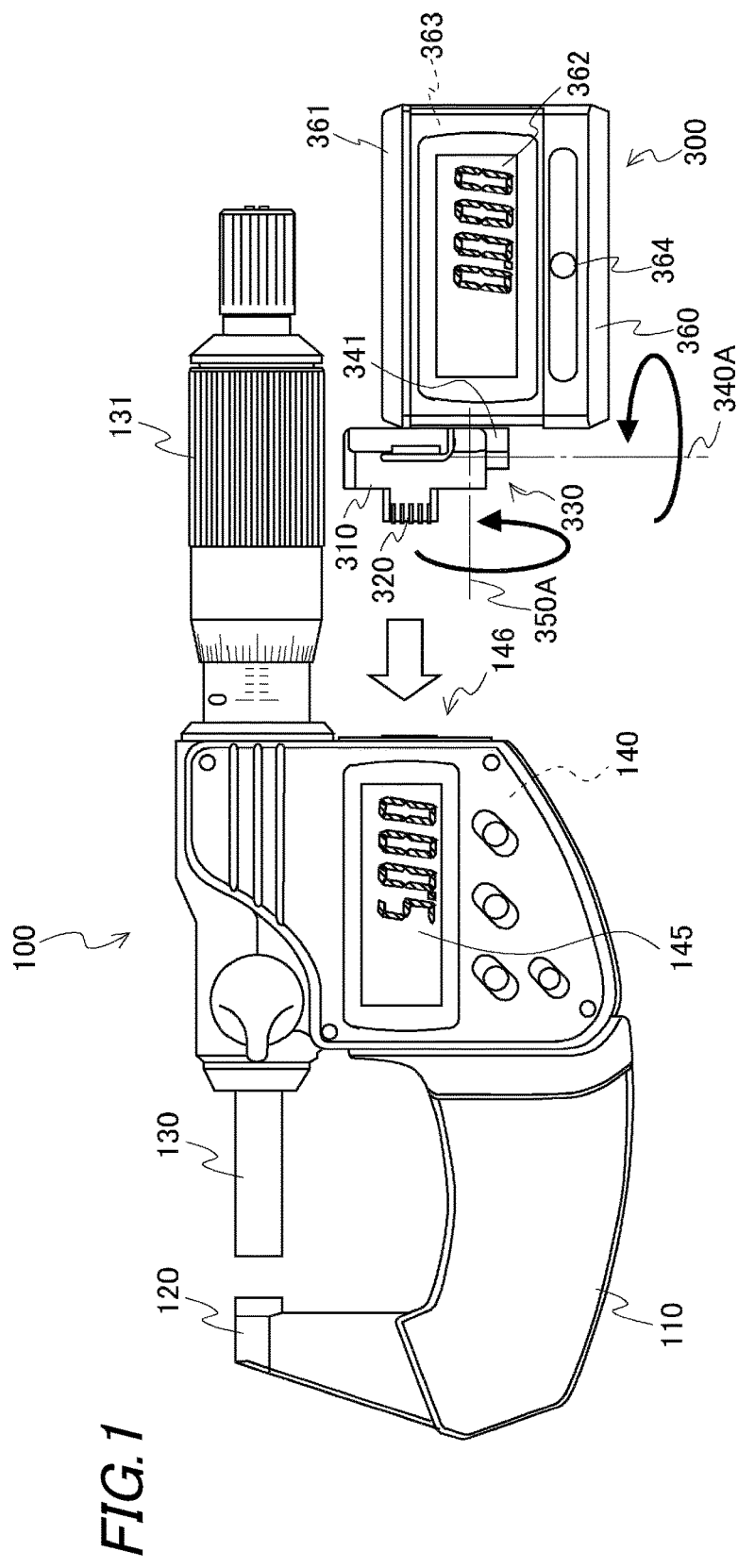
FIG. 1 is an exterior view of a micrometer and an external device.

Exemplary Embodiments of the present invention will be illustrated and also described with reference to reference numerals attached to elements in the drawings.

First Embodiment

The first embodiment of the present invention will be described with reference to FIGS. 1 to 6.

FIG. 1 is an exterior view of a digital type micrometer 100 and an external device 300 configured to be detachably attached to the micrometer 100.

The micrometer 100 includes a U-shaped frame 110, an anvil 120, a spindle 130 and an electric component unit 140.

The anvil 120 is arranged in one end of the U-shaped frame 110, and the spindle 130 is arranged on the other end of the U-shaped frame 110 so that the spindle 130 can move back and forth against the anvil 120.

When a thimble 131 is rotated with fingers, the spindle 130 is rotated together. The spindle 130 is configured to be moved back and forth by a feed screw. Also, an encoder (detecting means) (not shown) as a means for detecting an amount of rotation of the spindle 130 is provided on the other end of the U-shaped frame 110.

Herein, a measuring means is constituted of the U-shaped frame 110, the anvil 120, the spindle 130 and the encoder.

The electric component unit 140 is provided on the other end of the U-shaped frame 110.

The electric component unit 140 has a signal processing part (not shown) equipped therein, a first display part 145 and a connector connection port 146.

The first display part 145 is configured to digitally display information such as measurement data. The first display part 145 is provided on a surface of the micrometer 100 at the other end side of the U-shaped frame 110.

The connector connection port 146 is provided to be opened in a side surface of the U-shaped frame 110 at the other end side thereof. An input/output function of the micrometer 100 is performed via the connector connection port 146, and thus the micrometer 100 may be configured so that a wireless communication function is not equipped therein.

The external device 300 will be now described.

The external device 300 has a connector part 310, a movable connection part 330 and an external device body part 360.

The connector part 310 has a connection terminal 320 capable of being inserted into the connector connection port 146, and the connection terminal 320 is configured to be electrically connected to the signal processing part when being inserted in the connector connection port 146.

The movable connection part 330 is a so-called biaxial rotation hinge having two pivot axes 340A, 350A, which are in a twisted position relationship with respect to each other.

Figure 4:
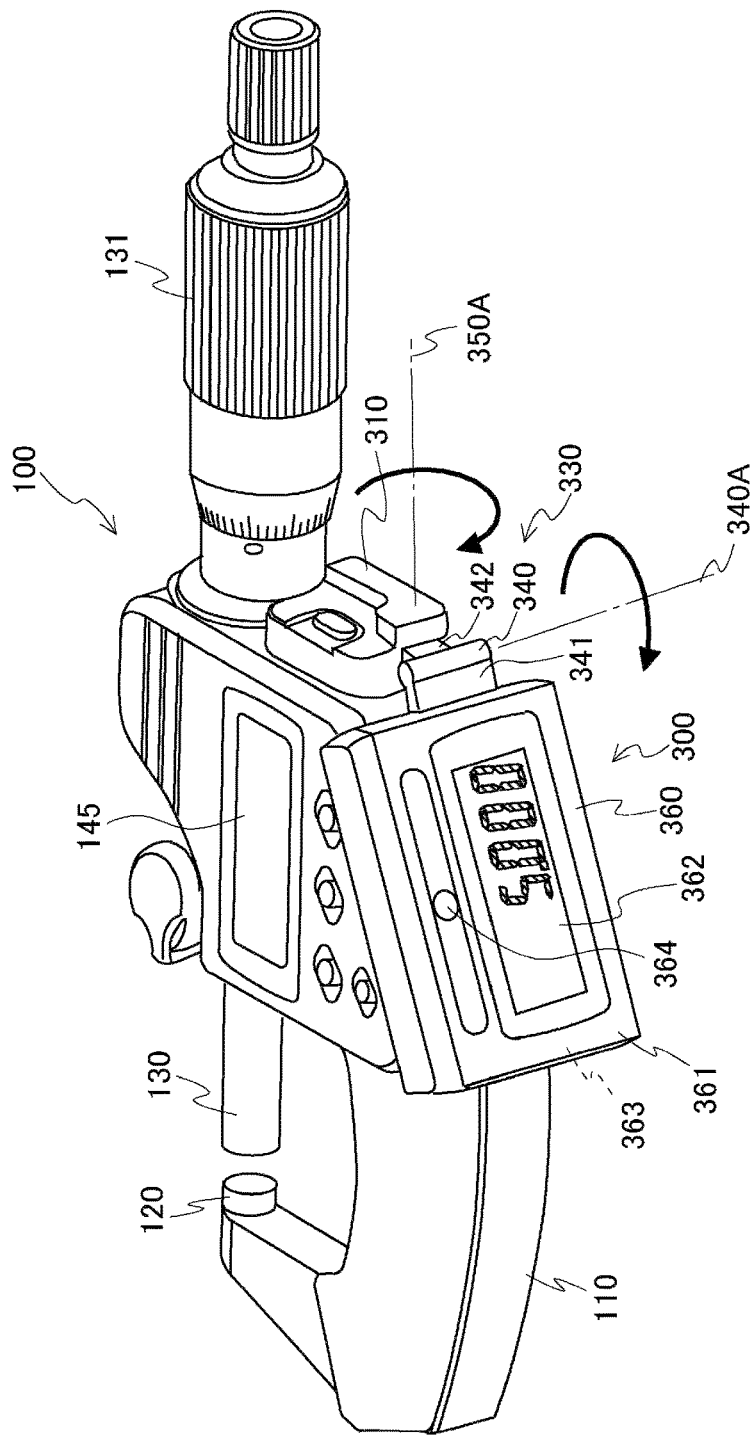
FIG. 4 is a view showing a state where the external device is connected to the micrometer.

Two pivot axes 340A, 350A can be easily understood, for example, with reference to FIG. 4.

One piece 341 of an openable hinge 340 is connected to the external device body part 360.

Also, the other piece 342 of the openable hinge 340 is pivotally supported on the connector part 310 to be rotatable about the rotation axis 350A. The external device body part 360 can be moved to be opened and closed with respect to the connector part 310 via the hinge axis 340A of the hinge 340, and also the external device body portion 360 can be rotated about an insertion direction of the connector part 310 via the rotation axis 350A.

In addition, the hinge axis 340A and the rotation axis 350A are in a twisted position relationship (multi-level crossing relationship). Typically and preferably, the hinge axis 340A and the rotation axis 350A are in a relationship where they are perpendicular to each other when one is projected toward the other. Further, the number of pivot axes is not limited to two, and accordingly, one pivot axis may be added to be parallel to the hinge axis 340A so that the hinge axes 340A form a parallel biaxial hinge.

The external device body part 360 has a flat rectangular-shaped case body 361 and various functional parts incorporated in the case body 361.

The functional parts, which are incorporated in the external device body portion 360, include a second display part 362 and a wireless communication unit 363.

The second display part 362 is arranged on a surface of the case body 361. The wireless communication unit 363 has an antenna portion and a transmission reception circuit. The wireless communication unit 363 is housed in the case body 361.

In addition, although not described in detail, a control circuit for integrally controlling a display function of the second display part 362 and a communication function of the wireless communication unit 363 is mounted in the external device body portion 360.

The external device body portion 360 is provided with an input means, and in the present embodiment, an operation button 364 is provided below the second display part 362.

The operation button 364 is used for a display switching operation and a transmission and reception operation, but two or more buttons may be employed. Instead of the button, a touch panel or a microphone for voice input may be employed as the input means.

Next, a case where the external device 300 is connected and used with the micrometer 100 will be described.

As described above, the micrometer 100 is not equipped with a wireless communication function. The micrometer 100 has advantages, such as being compact and reducing product price, since a useless function for a user who does not need a wireless communication function is not attached thereto. On the other hand, a user who wishes to use various functions such as a wireless communication function may connect and use the external device 300 with the micrometer 100.

Figure 2:
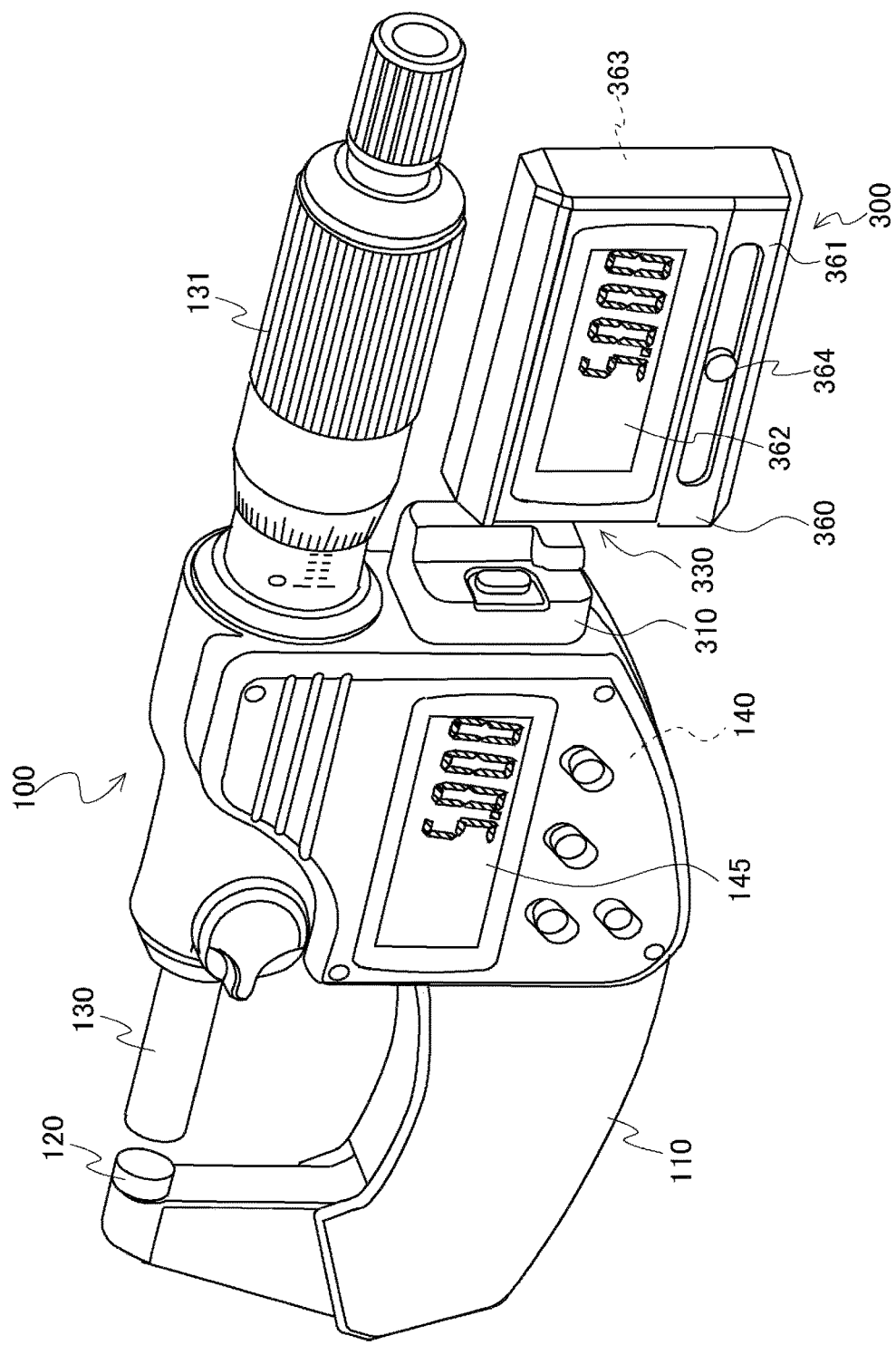
FIG. 2 is a view showing a state where the external device is connected to the micrometer.

FIG. 2 is a view showing a state where the external device 300 is connected to the micrometer 100.

The micrometer 100 is a small measuring instrument and thus naturally has a restriction on location where the connector connection port 146 is provided due to a space limitation. In the micrometer 100 of the present embodiment, the connector connection port 146 is provided on the side end surface of the U-shaped frame 110 at the other end thereof, but when the external device 300 is connected thereto, the external device 300 is positioned near the thimble 131.

In this case, there arises a problem that it is difficult to rotate the thimble 131.

Figure 3:
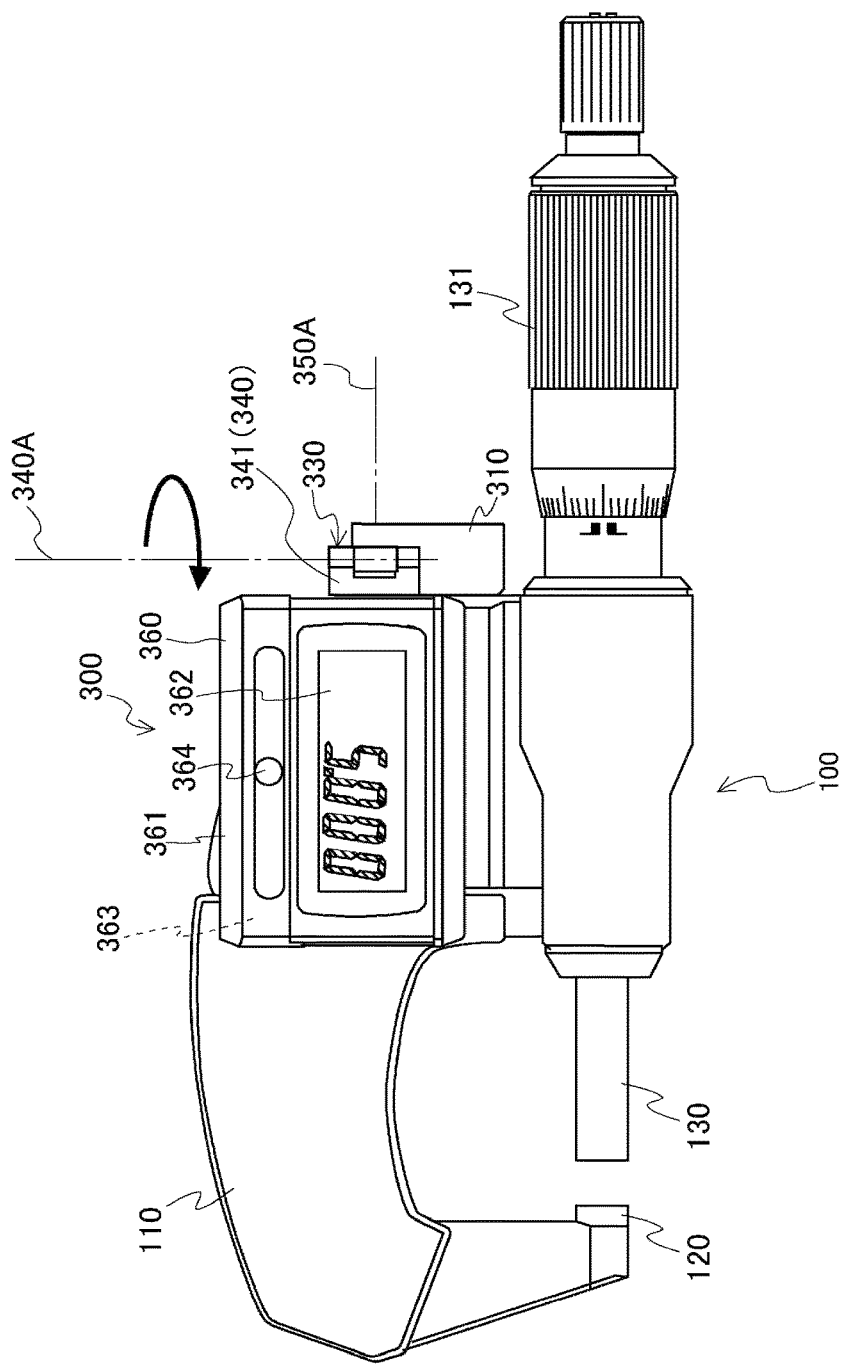
FIG. 3 is a view of the micrometer as viewed from a rear side thereof.

In this regard, since the external device 300 of the present embodiment has the movable connection part 330 having two axis degrees of freedom, it is possible to prevent the external device 300 from becoming an obstacle, for example by rotating the external device body portion 360 toward the rear side as shown in FIG. 3. At this time, even if the micrometer 100 is used from the rear side, the second display part 362 is visible from the rear side.

In addition, an indication on the second display part 362 may be configured to be rotated. For example, in the case of FIG. 3, the display of the second display part 362 may be configured to be rotated by 180°. Such an orientation of the indication may be based on a user instruction, which is intentionally instructed by a user using the operation button 364, or the indication may be automatically rotated by automatically deciding upper and lower sides using an accelerator sensor incorporated in the external device 300.

Also, as in FIG. 3, when the first display part 145 of the micrometer 100 is not visible to a user and only the second display part 362 of the external device 300 is visible to the user, the second display part 362 of the external device 300 may be configured to display the same content as that of the first display part 145 of the micrometer 100.

Alternatively, as illustrated in FIG. 4, the position of the external device body portion 360 may be changed using the rotation axis 350A and the hinge axis 340A, so that the external device body portion 360 is positioned along the side surface of the U-shaped frame 110. In addition, as in FIG. 4, even when the micrometer 100 is used while being slightly laid down on its side, the second display part 362 is well visible.

As such, when both the first display part 145 and the second display part 362 are visible, the first display part 145 may serve as a main display part and the second display part 362 may serve as a subsidiary display part for displaying an indication different from that of the first display part 145.

It is preferable that a measured value or the like is largely displayed on the first display part 145, which is the main display part, and the second display part 362 serves as a user interface associated with transmission and reception control.

Of course, in order to be easily viewed by the user, an orientation of the indication on the second display part 362 may be rotated by 90° or 270°.

Herein, in terms of preventing the external device 300 from becoming an obstacle to grasping the measuring instrument (micrometer 100) or allowing the display part (second display part 362) to be visible even in various measuring postures, the external device 300 may be used as illustrated in FIG. 3 or 4. However, considering the wireless communication function, it is necessary to further move the external device body portion 360 to a position or orientation in which the communication function is not disturbed. For example, it is undesirable that the whole external device body part 360 is gripped by hand when the micrometer 100 is grasped, or the external device 300 is covered with a body of a user, so that the body of the user becomes a major obstacle in the way of wireless communication between the external device 300 and a communication counterpart.

In this regard, since the external device 300 of the present embodiment has the movable connection part 330 having two axis degrees of freedom, it is easy to find a posture or position of the external device body portion 360 in which measurement is not disturbed, an indication is well visible and also communication is well maintained. For example, as illustrated in FIG. 5, an angle of the hinge axis 340A or the rotation axis 350 may be slightly adjusted.

Figure 5:
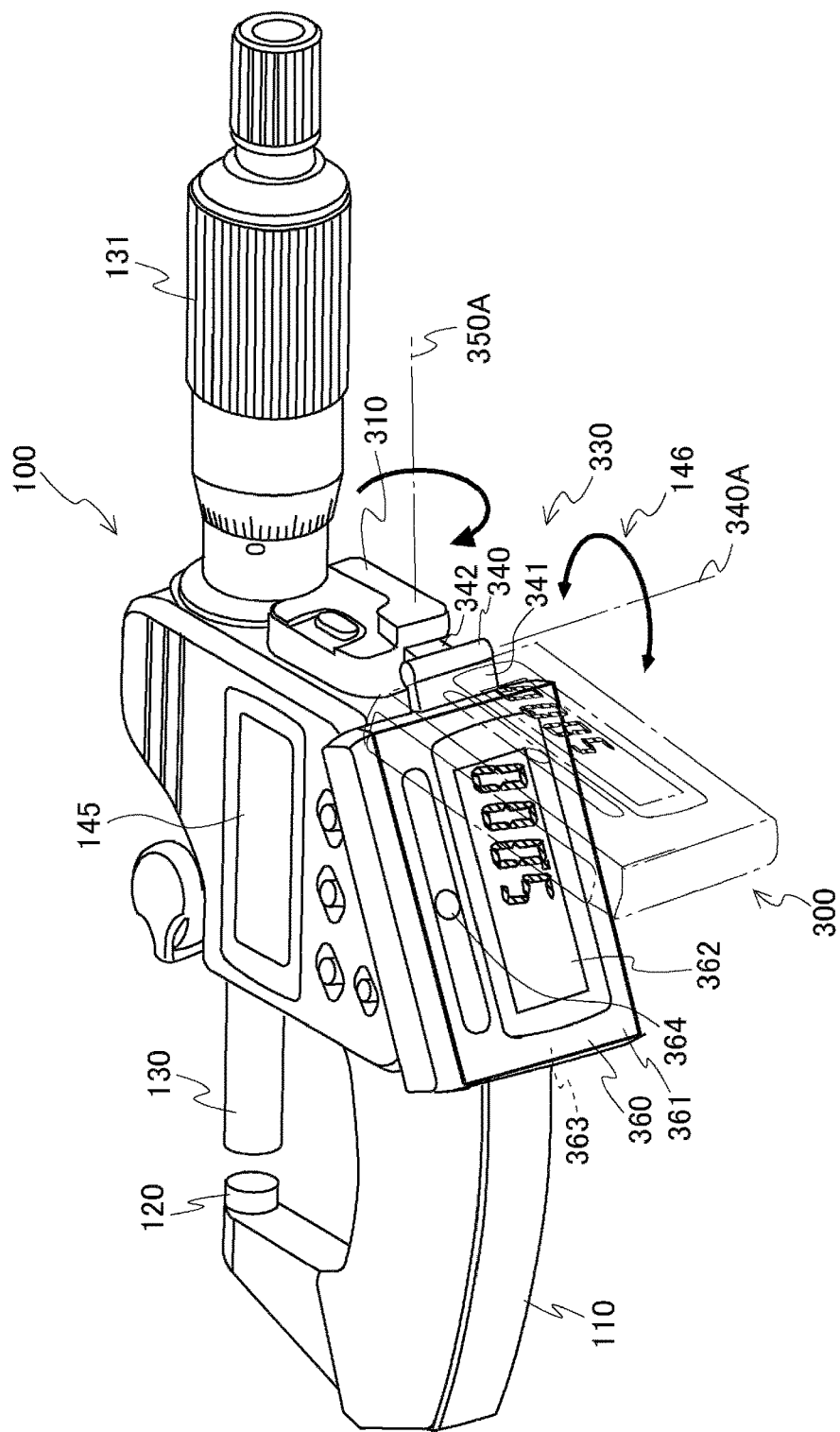
FIG. 5 is a view showing a state where the external device is connected to the micrometer.

If an external device 300 is configured to be attached to the micrometer 100 in the form of a fixed unit or if a movable connection part exists but has only one axis degree of freedom, it is impossible to adjust a portion or posture thereof as in FIGS. 3 to 5. Therefore, it will be necessary to sacrifice any one of ease of measurement, visibility of an indication and sensitivity of communication. In this regard, according to the external device 300 of the present embodiment, it is possible to expand functional aspects of the measuring instrument without hampering operability.

(Variants)

In addition to the wireless communication function or the display function, the following examples of functions may be incorporated in the external device 300. For example, a light (illumination) function may be incorporated. The second display part 362 of the external device 300 may be used as a light. If the second display part 362 is a liquid crystal panel, a back light thereof can be used as a lamp. Of course, a light (e.g., LED) dedicated to lighting separately to displaying may be incorporated into the external device 300.

A small measuring instrument such as the micrometer 100, a vernier calipers or a dial gauge is often used for measuring at a site to where the measuring instrument is carried, and thus there are many scenes that the surroundings thereof are dark. Until now, there has been a function for coping with a dark measuring environment, such as brightening a back light of the first display part 145.

Figure 6:
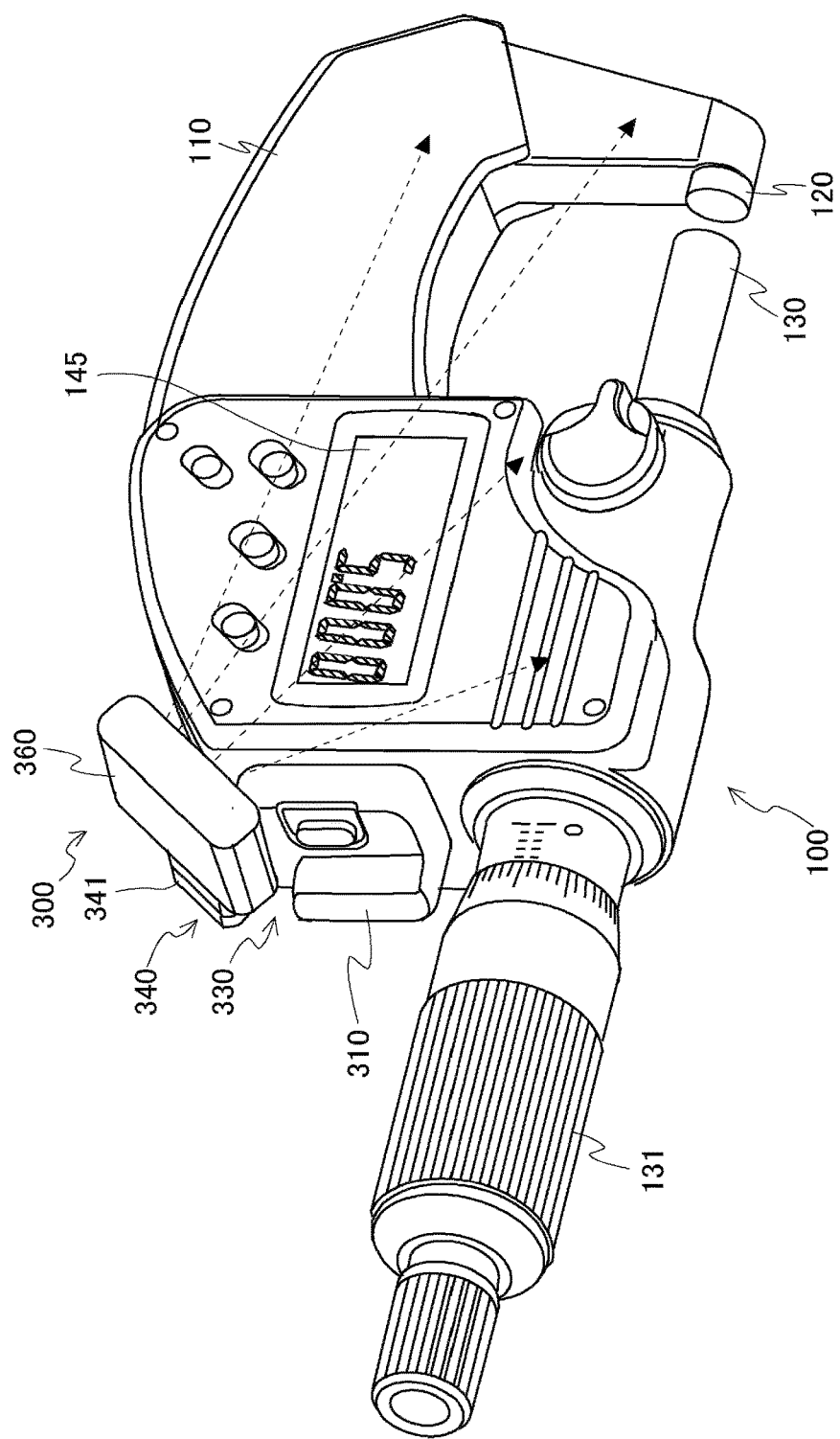
FIG. 6 is a view showing an example where the external device is used as a lamp.

However, if the surroundings are so dark that the first display part 145 is hardly viewed, the surroundings of hand or the spindle 130 and the anvil 120, between which an object to be measured is sandwiched, are also hardly viewed. Therefore, if only the first display part 145 is brightened, there is not much meaning, and thus a lamp for illuminating the entire surroundings of hand has to be still additionally carried. Herein, since the external device 300 of the present embodiment has the biaxial movable connection part 330 incorporated therein, it is possible to illuminate both the first display part 145 and the object to be measured, for example by adjusting an angle of the external device 300 as illustrated in FIG. 6.

Further, a solar panel (solar cell panel) may be incorporated in the external device 300. Since a slightly high electric power is required for wireless communication, it is undesirable that a battery of the micrometer 100 is used for the external device 300. Therefore, an electricity generation means is incorporated in the external device 300. In the case of the solar panel, it is required to orient the solar panel toward a side, from which light comes. Therefore, in order to allow a good electricity generation, an orientation of the external device 300 is preferably adjusted using the movable connection part 330 having two axis degrees of freedom.

It is preferable that a rechargeable battery (secondary battery) is incorporated in the external device 300 and electric power is supplied from the external device 300 to the micrometer 100 when the micrometer 100 is connected with the external device 300. Therefore, a life of the battery of the micrometer 100 is increased, thereby reducing efforts for maintenance. Even in the case of a multi-functionalized micrometer 100, efforts for maintenance are not required, thereby enhancing usability.

A speaker may be incorporated in the external device 300, so that a variety of information can be notified to a user via a buzzer or the like. For example, a success or failure of transmission of wireless communication may be notified to the user via the buzzer. Although there is room for discussion as to whether or not functions, which are not indispensible for measurement, such as the speaker, have to be always equipped in the micrometer itself, if the external device 300 can be detachably attached, convenient functions may be installed on the external device 300 without hesitation.

Meanwhile, the present invention is not limited to the foregoing embodiments, but can be appropriately modified within the scope without departing from the spirit of the invention.

Although the connector connection port has been described as being provided on the measuring instrument (micrometer, vernier calipers or dial gauge), a plug (pin) may be provided on the measuring instrument and a connector of the external device may be provided as a connection port. Also, the connection port may be configured in a multi-pole pin jack type.

What is claimed is:

1. An external device configured to be detachably attached to a measuring instrument having a connection port which is electrically connectable to the external device, the connection port being provided adjacent to an operating portion of the measuring instrument, the external device comprising:
   a connector part that has a connection terminal capable of being inserted into the connection port;
   a sensor;
   an external device body part that has a display part on a side surface of the external device body part, the display part being configured to rotate an orientation of displayed information in response to data from the sensor; and
   a movable connection part that couples the connector part with the external device body part;
   wherein the movable connection part is a biaxial rotation hinge having two pivot axes which are perpendicular and skewed to each other.

2. The external device according to claim 1, wherein the external device body part is configured to perform a wireless communication.

3. The external device according to claim 1, further comprising:
   a light coupled to the external device body part, the light being configured to illuminate an object to be measured when the external device is connected with the measuring instrument.

4. The external device according to claim 1, further comprising:
   a rechargeable battery coupled to the external device body part, the rechargeable battery being configured to supply electric power to the measuring instrument when the external device is connected with the measuring instrument.

5. The external device according to claim 1, wherein the measuring instrument to be connected with the external device is a digital micrometer, a digital vernier calipers, or a digital indicator.

* * * * *